United States Patent Office 3,159,682
Patented Dec. 1, 1964

3,159,682
PROCESS FOR PREPARING β-HYDROXYALKYL SULPHONIUM SALTS
William Baird and John Woolley Batty, both of Manchester, England, assignors to Imperial Chemical Industries Limited, London, England, a corporation of Great Britain
No Drawing. Filed Apr. 20, 1962, Ser. No. 188,989
Claims priority, application Great Britain, May 5, 1961, 16,355
13 Claims. (Cl. 260—607)

This invention relates to a process for preparing β-hydroxyalkyl sulphonium salts.

According to the present invention we provide a process for the manufacture of sulphonium salts of the type

where $R_1$ is a hydroxyalkyl group as hereinafter defined and $R_2$ and $R_3$ may be straight or branched chain alkyl or substituted alkyl, or alkenyl, aryl, aralkyl, alicyclic, or heterocyclic groups as hereinafter defined the same or different and X is the anion of an acid which comprises reacting a sulphide of the type $R_2SR_3$ with an alkylene oxide in the presence of an aqueous acid HX.

The group $R_1$ may be ($CHR_4$—$CHR_5OH$) wherein $R_4$ and $R_5$ may be hydrogen or lower alkyl the same or different, the lower alkyl group preferably containing from 1 to 3 carbon atoms.

The straight or branched chain alkyl groups from which $R_2$ and $R_3$ may be selected may contain up to 22 carbon atoms but it is preferred that they contain from 1 to 18 carbon atoms. By a substituted alkyl group we mean the group ($CHR_4$—$CHR_5OH$) as hereinbefore defined or straight or branched chain alkyl groups which may contain up to 22 carbon atoms and contain as substituents for example hydroxyl, carboxyl, ether, ester, mercapto, thioether, keto, cyano, sulphonic acid or sulphuric ester groups.

By alkenyl groups we mean aliphatic hydrocarbon groups which contain one double bond for example vinyl, methyl vinyl or allyl groups. By aryl groups we mean those groups which are derived from a member of the benzene or naphthalene series, for example phenyl or naphthyl groups. By aralkyl groups we mean alkyl groups which are themselves substituted by an aryl group for example the benzyl group. By alicyclic groups we mean groups which contain a non-benzenoid cyclic carbon ring, for example the cyclohexyl group. By heterocyclic groups we mean groups which contain a closed ring system of atoms of more than one kind for example the pyridyl or quinolyl groups. Any of the aforementioned groups may contain as substituents for example hydroxyl, carboxyl, ether, ester, mercapto, thioether keto, cyano, sulphonic acid or sulphuric ester groups.

Suitable sulphides are for example dimethyl sulphide, methylethyl sulphide, dioctadecyl sulphide, methyl (β-hydroxyethyl)sulphide, bis(β-hydroxyethyl)sulphide, bis (2-hydroxypropyl) sulphide, benzyl sulphide, methyl vinyl sulphide, methylphenyl sulphide.

Suitable alkylene oxides are for example ethylene, propylene and butylene oxides.

The acid HX may be mono- or polybasic and may be a weak acid for example formic acid, acetic acid or carbonic acid, or a strong acid for example sodium bisulphate or sulphuric acid. We prefer to employ sulphuric acid in the process of the present invention.

The amount of HX used is preferably the stoichiometric equivalent of the amount of sulphide used. When less than this amount of HX is used the yield of the sulphonium cation is lowered and although larger amounts of HX may be used no particular advantage is to be gained thereby.

The reaction is carried out in the presence of water and we have found that the yield of the sulphonium cation is generally at an optimum between a usage of from 2 to 4 molecular equivalents of water for every mole of sulphide used. Where desirable a suitable inert solvent for the sulphide may be employed, for example dioxan.

The temperature of reaction may vary between wide limits, for example −20° C. to 120° C. but it is found that better yields of the sulphonium compounds are obtained by working at low temperatures and it is preferred that the temperature of reaction lies between 0° C. and 25° C.

The sulphonium compounds prepared by the process of the present invention are obtained in high yield and in a high degree of purity.

Depending on their structure, the products may be of interest as bactericides or as intermediates for the preparation of textile auxiliaries.

The invention is especially valuable in the preparation of tris-(β-hydroxyethyl)sulphonium salts from thiodiglycol where the known reaction with ethylene chlorhydrin to produce tris-(β-hydroxyethyl)sulphonium chloride results in the formation of strongly vesicant and and lachrymatory by-products presumably of the mustard gas type.

The invention is illustrated but not limited by the following examples in which parts are by weight:

Example 1

Thiodiglycol (61 parts), water (27 parts) and acetic acid (29.6 parts) were stirred together and ethylene oxide (20 parts) passed in during a period of about 2¾ hours at a temperature of 35–40° C. Addition of hydrochloric acid until just acid to Congo Red followed by evaporation and crystallisation of the residue from ethanol enabled the product to be isolated as the known tris-(β-hydroxyethyl)sulphonium chloride M.P. 126–127 C. in a yield of 61 parts.

Example 2

122 parts of thiodiglycol, 49 parts of sulphuric acid and 54 parts of water were stirred at 40–45° C. Ethylene oxide was passed into the solution through a sintered glass distributor until an increase of 44 parts by weight was obtained. The water was evaporated under reduced pressure leaving the tris-(β-hydroxyethyl)sulphonium sulphate as a clear viscous oil. The product was stirred at 20° C. with 80 parts of 95% industrial methylated spirit while 103 parts of concentrated hydrochloric acid of specific gravity 1.18 were added. The white precipitate formed was filtered off, washed with small amounts of industrial methylated spirit until the washings were no longer acid to Congo Red and dried at 40° C. at a pressure of 20 mm. for 4 hours. It consisted essentially of tris(β-hydroxyethyl)sulphonium chloride.

Example 3

244 parts of thiodiglycol were added to a stirred solution of 100 parts of 98% concentrated sulphuric acid in 108 parts of water, maintaining the temperature below 20° C. Ethylene oxide was then passed into the solution through a sintered distributor, maintaining the reaction temperature at 15–25° C. until an increase of 91 parts by weight was obtained. There was obtained 543 parts of a clear, substantially colourless aqueous solution. The product was analysed, and the following figures were found:

Tris(β-hydroxyethyl)sulphonium salts (calculated as tris (β-hydroxyethyl)sulphonium sulphate, M.W.430) 67.4% w/w.

Free acidity (calculated as sulphuric acid) 1.0% w/w.
Sulphate (calculated as sulphuric acid) 14.0% w/w.

*Example 4*

61 parts of thiodiglycol and 27 parts of water were stirred at 15–20° C. whilst 13.5 parts of 98% concentrated sulphuric acid were added. The mixture was cooled to 15° C. and maintained at this temperature whilst 30 parts of propylene oxide were slowly added and then the mixture was maintained at 15–20° C. during a further 3 hours. After removing water at 40–50° C. under reduced pressure the product was a viscous syrup which partially solidified on standing. On analysis for sulphonium salts it was found to contain 70.8% of bis(β-hydroxyethyl)β-hydroxypropyl sulphonium sulphate.

*Example 5*

25 parts of bis(β-hydroxypropyl)sulphide and 9 parts of water were stirred and 8.3 parts of 98% concentrated sulphuric acid were added whilst maintaining the temperature below 10° C. The mixture was cooled to 0° C., and 12 parts of propylene oxide were slowly added whilst maintaining the temperature at 0–5° C. and the whole maintained at 5–15° C. during 3 hours. After removing water at 40–50° C. under reduced pressure the product was a viscous syrup which partially solidified on standing. On analysis for sulphonium salts it was found to contain 58.7% of tris(β-hydroxypropyl)sulphonium sulphate.

*Example 6*

122 parts of thiodiglycol and 55 parts of water were stirred at 5–10° C. and ethylene oxide passed into the reaction mixture whilst maintaining a rapid stream of carbon dioxide through the apparatus. The weight of the mixture increased by 56 parts during 12 hours. Concentrated hydrochloric acid (61 parts of approx. 35% strength) was added to the mixture until a faintly acid reaction to Congo Red paper was obtained, water was removed under reduced pressure at 40° C. and the residue dissolved in an equal bulk of absolute ethanol and cooled to 0° C. 106.8 parts of tris(β-hydroxyethyl)sulphonium chloride M.P. 126° C. was obtained.

*Example 7*

122 parts of thiodiglycol, 54 parts of water and 45 parts of ethylene oxide were reacted with 49 parts of carbon dioxide at 44–47° C. in a pressure vessel. The initial pressure of 20 atmos. fell to 9 atmos. during 8 hours. The product was neutralised with hydrochloric acid and the sulphonium chloride isolated as described in Example 6. 133.4 parts of tris (β-hydroxyethyl)sulphonium chloride M.P. 125° C. were obtained.

*Example 8*

Preparations were carried out substantially by the method of Example 3 except that reaction temperatures of 80–85° C., 40–45° C., 20–25° C., and 0–5° C. were used. The yields of tris(β-hydroxyethyl)sulphonium salts, calculated as the sulphate, M.W. 430, are shown below:

| Temperature (° C.): | Yield (calc. on thiodiglycol), percent |
|---|---|
| 80–85 | 62.2 |
| 40–45 | 76.5 |
| 20–25 | 85.1 |
| 0–5 | 85.9 |

*Example 9*

Preparations were carried out by the method of Example 3, except that the molar ratio of water: thiodiglycol was varied from 2:1 to 6:1 instead of 3:1 as in Example 3. The yields of tris(β-hydroxyethyl)sulphonium compounds, calculated as the sulphate, are shown below:

| Molar ratio of water:thiodiglycol: | Yield (percent calc. on thiodiglycol) |
|---|---|
| 2.0:1.0 | 82.3 |
| 2.5:1.0 | 83.3 |
| 3.0:1.0 | 84.5 |
| 3.5:1.0 | 84.3 |
| 4.0:1.0 | 82.6 |
| 5.0:1.0 | 81.0 |
| 6.0:1.0 | 80.4 |

*Example 10*

Thiodiglycol, water, acetic acid and ethylene oxide were reacted together substantially by the method of Example 1, but varying the molar ratio of water: thiodiglycol, or reaction temperature. The percent yields of tris (β-hydroxyethyl)sulphonium acetate, calculated on thiodiglycol, are given in the following table:

| Molar ratio of water: thiodiglycol | Reaction temperature | |
|---|---|---|
| | 0.5° C. | 20–25° C. |
| 0.05:1.0 | 67.1 | |
| 2.0:1.0 | 69.1 | 68.5 |
| 3.0:1.0 | 79.2 | 75.4 |
| 4.0:1.0 | 77.4 | 75.0 |

*Example 11*

106 parts of ethyl(β-hydroxyethyl)sulphide were added to a solution of 49 parts of concentrated sulphuric acid in 54 parts of water, the temperature being maintained below 25° C. during the additions. Ethylene oxide was then passed into the stirred mixture through a sintered glass distributor, at 20–25° C., until a weight increase of 44 parts was obtained. There was obtained a clear, substantially colourless aqueous solution containing 63–65% w/w of ethyl-bis(β-hydroxyethyl)sulphonium compounds, calculated as the sulphate.

What we claim is:

1. A process for the manufacture of β-hydroxyalkyl sulphonium salts which comprises reacting a sulfide of the formula:

$$R_2SR_3$$

with an alkylene oxide of the formula:

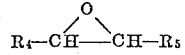

and an acid of the formula:

$$HX$$

in the presence of water and at a temperature within the range of from about —20° C. to about 120° C., to form the sulphonium salt of the formula:

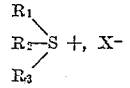

wherein

R₁ stands for a hydroxyalkyl radical of the formula —CHR₄CHR₅OH, and

R₄ and R₅ are selected from the class consisting of hydrogen and the lower alkyl radicals containing from 1 to 3 carbon atoms; and, R₂ and R₃ stand for radicals selected from the class consisting of straight and branched chain lower alkyl radicals and hydroxy lower alkyl radicals, alkenyl radicals containing from 2 to 3 carbon atoms, benzene and naphthalene aryl radicals, benzyl radicals, and cyclohexyl radicals, and X stands for the anion of an acid.

2. Process for the manufacture of sulphonium salts according to claim 1 wherein, R₂ stands for a lower alkyl radical and $R_3$ stands for an hydroxy alkyl radical of the formula:

$$-CHR_4CHR_5OH$$

3. Process for the manufacture of sulphonium salts according to claim 1, wherein the alkylene oxide is selected from the class consisting of ethylene oxide, propylene oxide, and butylene oxide.

4. Process for the manufacture of sulphonium salts according to claim 3, wherein $R_2$ and $R_3$ stand for hydroxyalkyl radicals of the formula $-CHR_4CHR_5OH$.

5. Process for the manufacture of sulphonium salts according to claim 4, wherein $R_4$ and $R_5$ stand for hydrogen and the sulphide $R_2SR_3$ is thiodiglycol.

6. Process for the manufacture of sulphonium salts according to claim 5, wherein the acid HX is sulphuric acid.

7. Process for the manufacture of sulphonium salts according to claim 6, wherein from 2 to 4 molecular equivalents of water are present for every mole of sulphide used.

8. Process for the manufacture of sulphonium salts according to claim 7, wherein the sulphuric acid is used in substantially the stoichiometric equivalent of the thiodiglycol.

9. Process for the manufacture of sulphonium salts according to claim 8, wherein the reaction is carried out at a temperature within the range 0° C. to 25° C.

10. Process for the manufacture of sulphonium salts according to claim 1, wherein from 2 to 4 molecular equivalents of water are present for every mole of sulphide used.

11. Process for the manufacture of sulphonium salts according to claim 1, wherein the amount of the acid HX used is substantially the stoichiometric equivalent of the amount of sulphide used.

12. Process for the manufacture of sulphonium salts according to claim 1, wherein the acid HX is selected from the group consisting of formic, acetic, carbonic, sodium bisulphate, and sulphuric acids.

13. Process for the manufacture of sulphonium salts according to claim 12, wherein the acid HX is sulphuric acid.

References Cited by the Examiner

Becco Chemical Division of Food Machinery and Chemical Corporation, Bulletin No. 69, page 42.

Lutringhaus et al., Chemical Abstracts 54, 8595 (1960).

CHARLES B. PARKER, *Primary Examiner.*

D. D. HORWITZ, IRVING MARCUS, *Examiners.*